US011189160B1

(12) United States Patent
Natauri

(10) Patent No.: US 11,189,160 B1
(45) Date of Patent: Nov. 30, 2021

(54) SITUATION TAG FOR INDIVIDUAL SAFETY APPARATUSES, METHODS AND SYSTEMS

(71) Applicant: Jo Natauri, New York, NY (US)

(72) Inventor: Jo Natauri, New York, NY (US)

(*) Notice: Subject to any disclaimer, the term of this patent is extended or adjusted under 35 U.S.C. 154(b) by 0 days.

(21) Appl. No.: 16/172,689

(22) Filed: Oct. 26, 2018

Related U.S. Application Data

(60) Provisional application No. 62/577,663, filed on Oct. 26, 2017.

(51) Int. Cl.
  *G08B 25/01* (2006.01)
  *G08B 21/04* (2006.01)
  *H04M 1/72412* (2021.01)
  *H04M 1/72421* (2021.01)

(52) U.S. Cl.
  CPC ......... *G08B 25/016* (2013.01); *G08B 21/043* (2013.01); *G08B 21/0446* (2013.01); *H04M 1/72412* (2021.01); *H04M 1/72421* (2021.01)

(58) Field of Classification Search
  None
  See application file for complete search history.

(56) References Cited

U.S. PATENT DOCUMENTS

| | | | | |
|---|---|---|---|---|
| 9,426,638 | B1* | 8/2016 | Johnson | H04W 4/90 |
| 9,491,580 | B1* | 11/2016 | Hagon | H04W 4/90 |
| 9,799,206 | B1* | 10/2017 | Wilson Van Horn | H04N 7/188 |
| 9,965,936 | B1* | 5/2018 | Epps | G08B 21/02 |
| 10,015,839 | B1* | 7/2018 | Depew | G08B 25/016 |
| 10,271,196 | B1* | 4/2019 | Yanamandra | H04M 1/00 |
| 2011/0298613 | A1* | 12/2011 | Ben Ayed | A61B 5/7415 340/539.11 |
| 2013/0214925 | A1* | 8/2013 | Weiss | G08B 25/001 340/539.11 |
| 2014/0218537 | A1* | 8/2014 | Nepo | G08B 15/004 348/158 |
| 2015/0065082 | A1* | 3/2015 | Sehgal | G08B 25/016 455/404.2 |
| 2015/0111523 | A1* | 4/2015 | South | G08B 25/016 455/404.2 |
| 2015/0187187 | A1* | 7/2015 | Del Toro | H04M 1/7253 340/539.11 |
| 2015/0279199 | A1* | 10/2015 | Yarkoni | G08B 25/016 340/539.11 |

(Continued)

*Primary Examiner* — Chico A Foxx
(74) *Attorney, Agent, or Firm* — Hanchuk Kheit LLP; Walter G. Hanchuk

(57) ABSTRACT

The Situation Tag for Individual Safety Apparatuses, Methods and Systems ("SiTa") transforms registration request, alert request inputs via SiTa components into alert response, alert notification outputs. A safety activation event is detected. Primary period media is recorded via a sensor array. Network communication with an app instantiated on a paired mobile device of the user is established. Location data associated with the situational safety device is determined. The location data is provided to the paired mobile device for transfer to a remote situational safety server. A timestamp is determined for the primary period media. The primary period media and the timestamp is provided to the paired mobile device for transfer to the remote situational safety server. Secondary period media is recorded via the sensor array. The secondary period media is provided to the paired mobile device for transfer to the remote situational safety server.

18 Claims, 7 Drawing Sheets

SiTa SCREENSHOT

(56) References Cited

U.S. PATENT DOCUMENTS

| | | | | |
|---|---|---|---|---|
| 2015/0364030 | A1* | 12/2015 | Comstock | G08B 25/016 340/539.11 |
| 2016/0022227 | A1* | 1/2016 | Chen | A61B 5/747 600/300 |
| 2016/0063851 | A1* | 3/2016 | Vaidyanathan | H04W 4/90 340/539.13 |
| 2016/0119424 | A1* | 4/2016 | Kane | H04L 67/10 709/203 |
| 2016/0155310 | A1* | 6/2016 | Joao | G06F 19/00 340/573.1 |
| 2016/0196737 | A1* | 7/2016 | Martin | H04N 5/77 340/539.13 |
| 2016/0210838 | A1* | 7/2016 | Yan | G08B 21/043 |
| 2016/0351207 | A1* | 12/2016 | Hassani | G10L 15/22 |
| 2017/0061781 | A1* | 3/2017 | Ware | G08B 25/016 |
| 2017/0124834 | A1* | 5/2017 | Pedersoli | H04W 4/90 |
| 2018/0053401 | A1* | 2/2018 | Martin | H04W 4/90 |
| 2018/0306616 | A1* | 10/2018 | Gillette, II | F04B 39/0207 |
| 2018/0308342 | A1* | 10/2018 | Hodge | G08B 21/0453 |
| 2018/0332162 | A1* | 11/2018 | Schutter | H04W 4/029 |
| 2018/0338237 | A1* | 11/2018 | Maheswaranathan | H04W 4/90 |
| 2018/0357887 | A1* | 12/2018 | Geyer | G08B 25/016 |
| 2019/0082044 | A1* | 3/2019 | Melendez | H04M 1/72538 |
| 2019/0206230 | A1* | 7/2019 | Musumano | H04L 67/327 |
| 2019/0365333 | A1* | 12/2019 | Keen | A61B 5/0022 |
| 2020/0135005 | A1* | 4/2020 | Katz | G08B 25/016 |

* cited by examiner

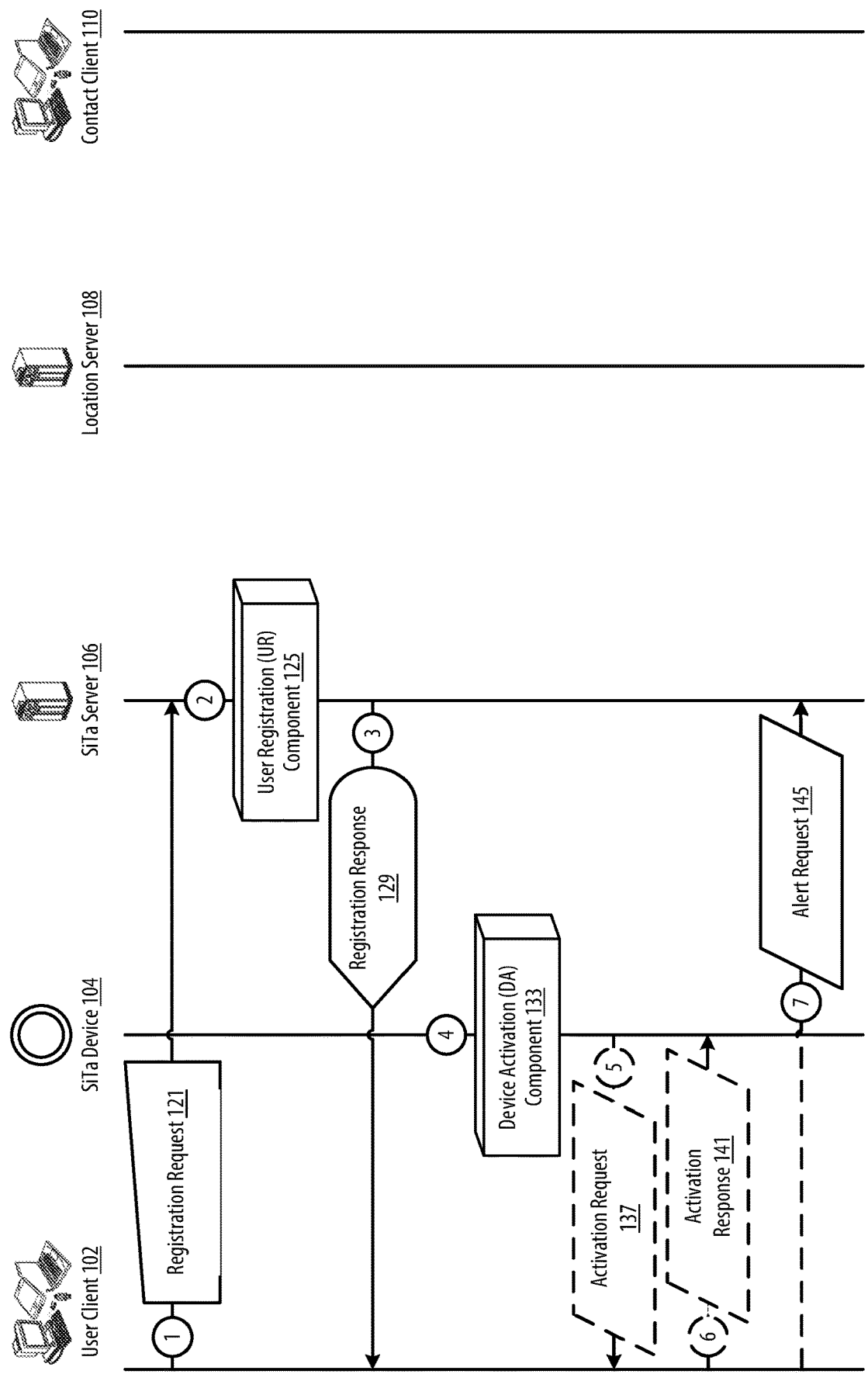

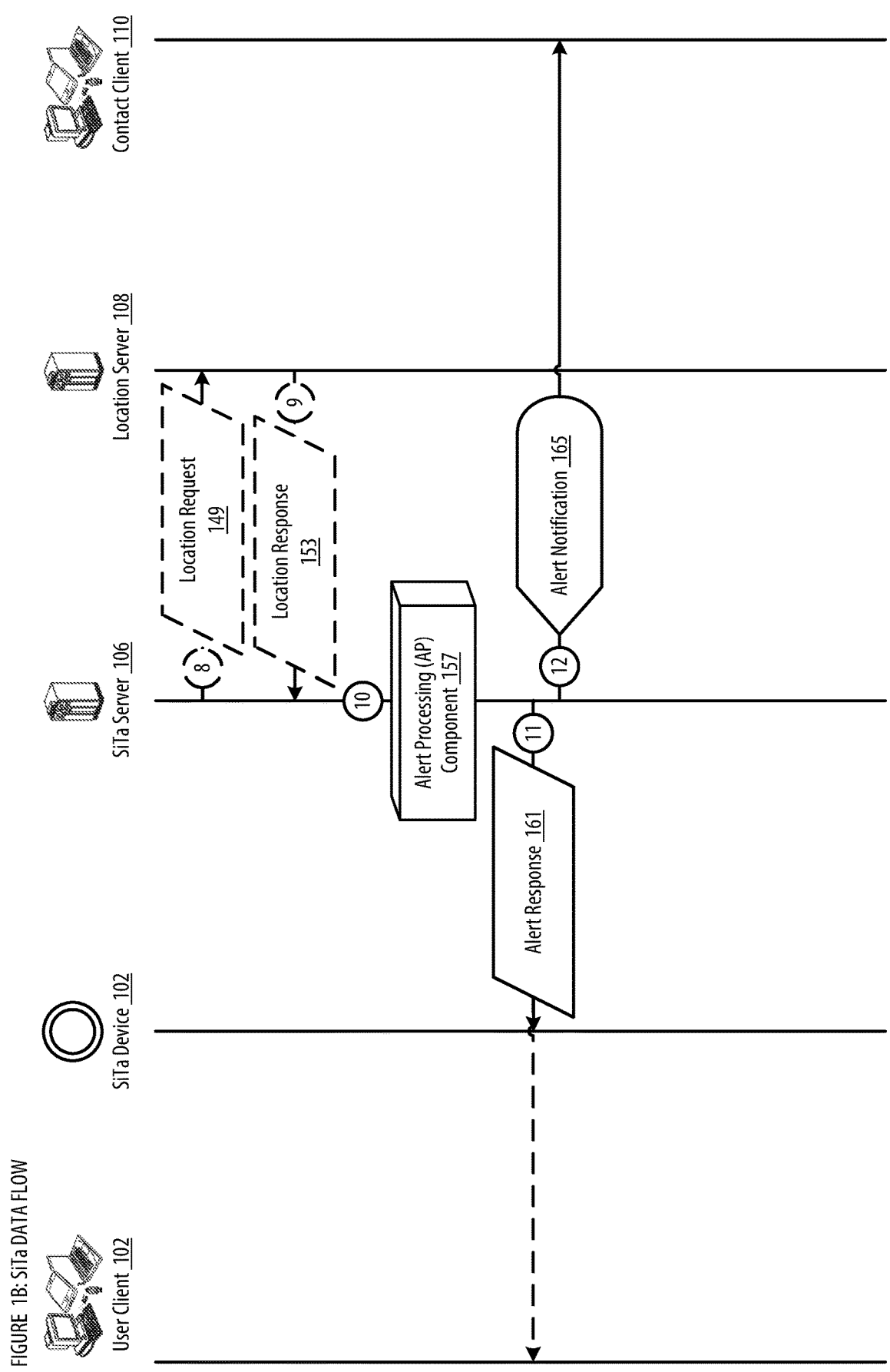

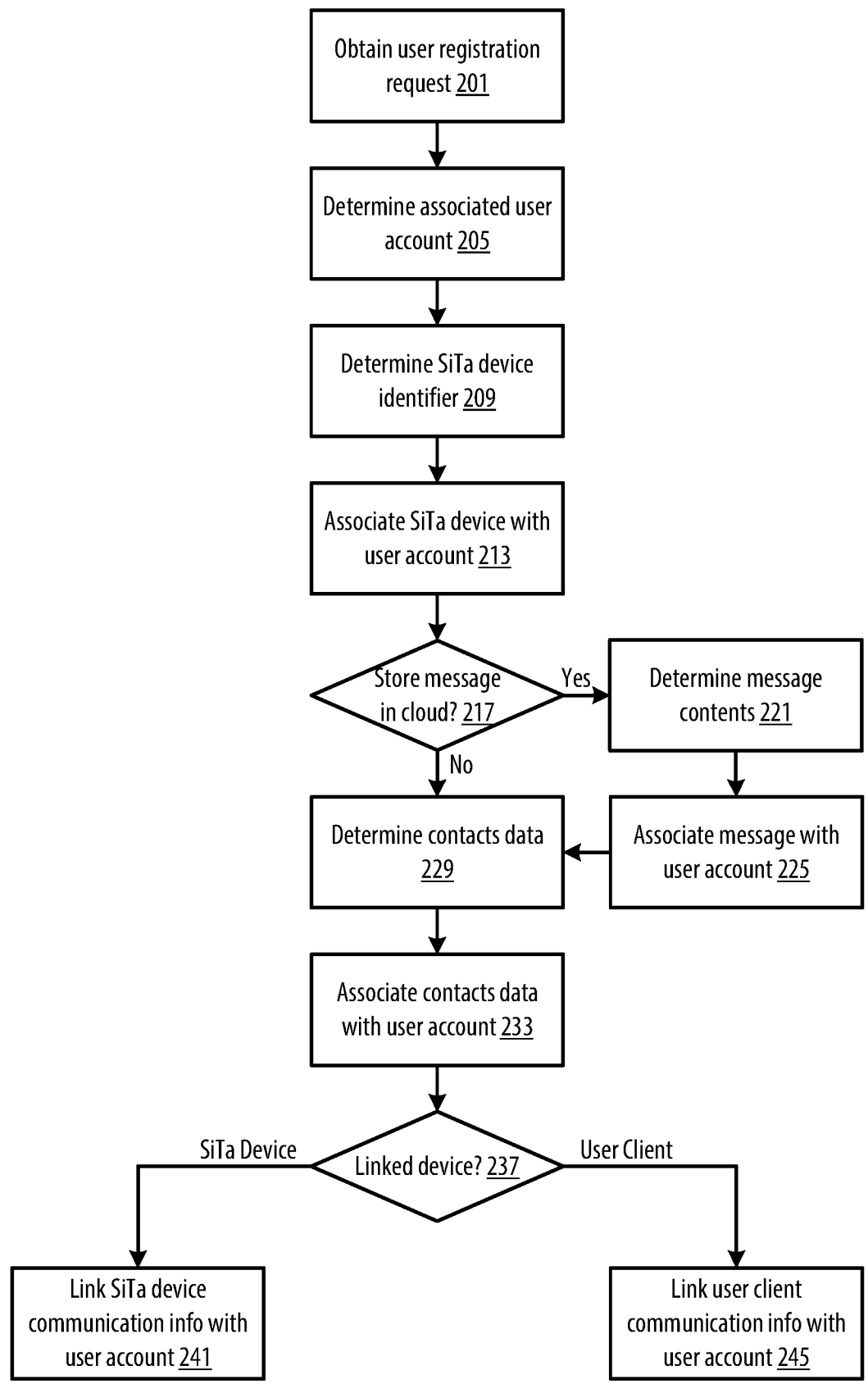
FIGURE 2: SiTa UR COMPONENT

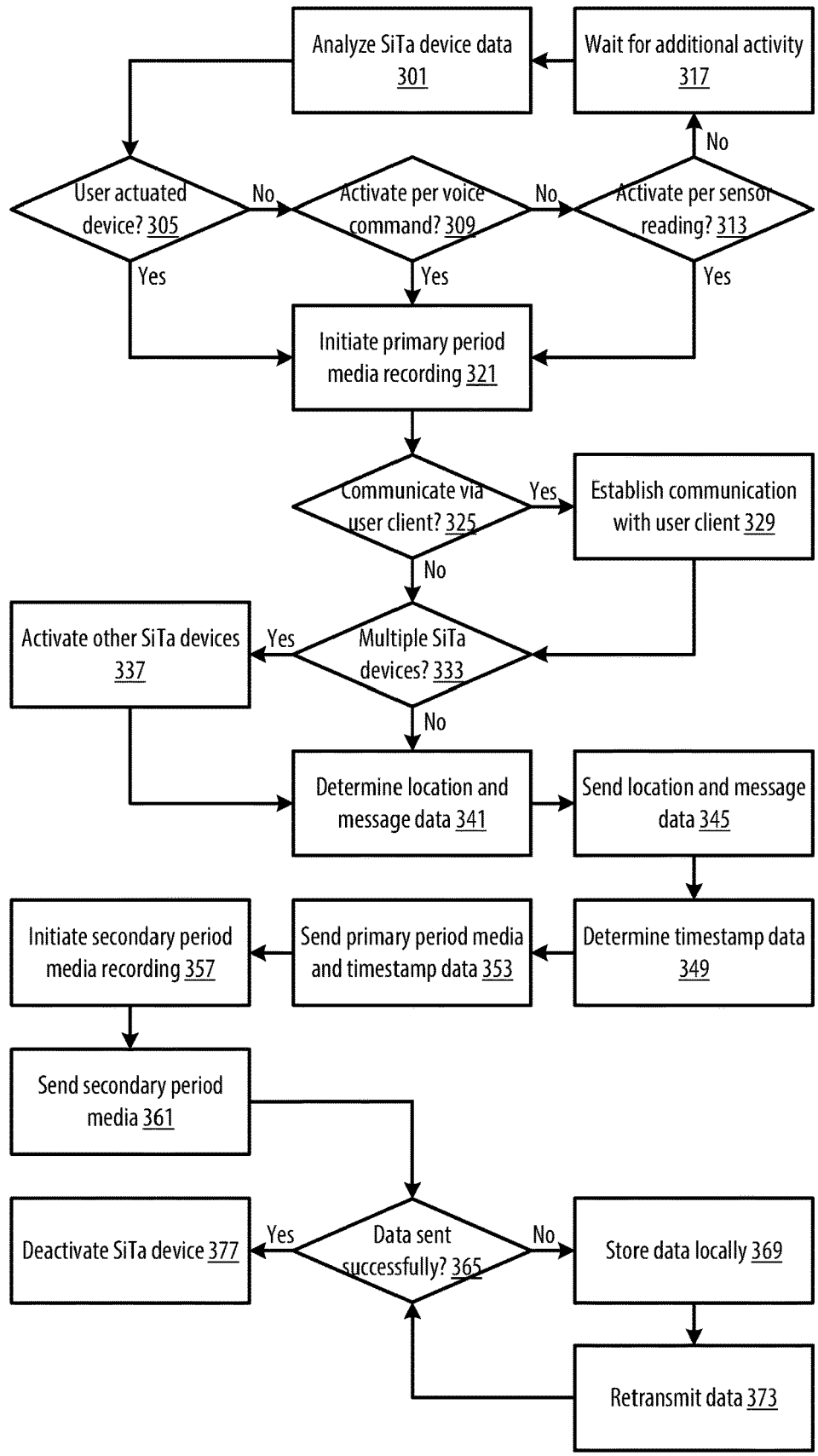
FIGURE 3: SiTa DA COMPONENT

FIGURE 4: SiTa AP COMPONENT
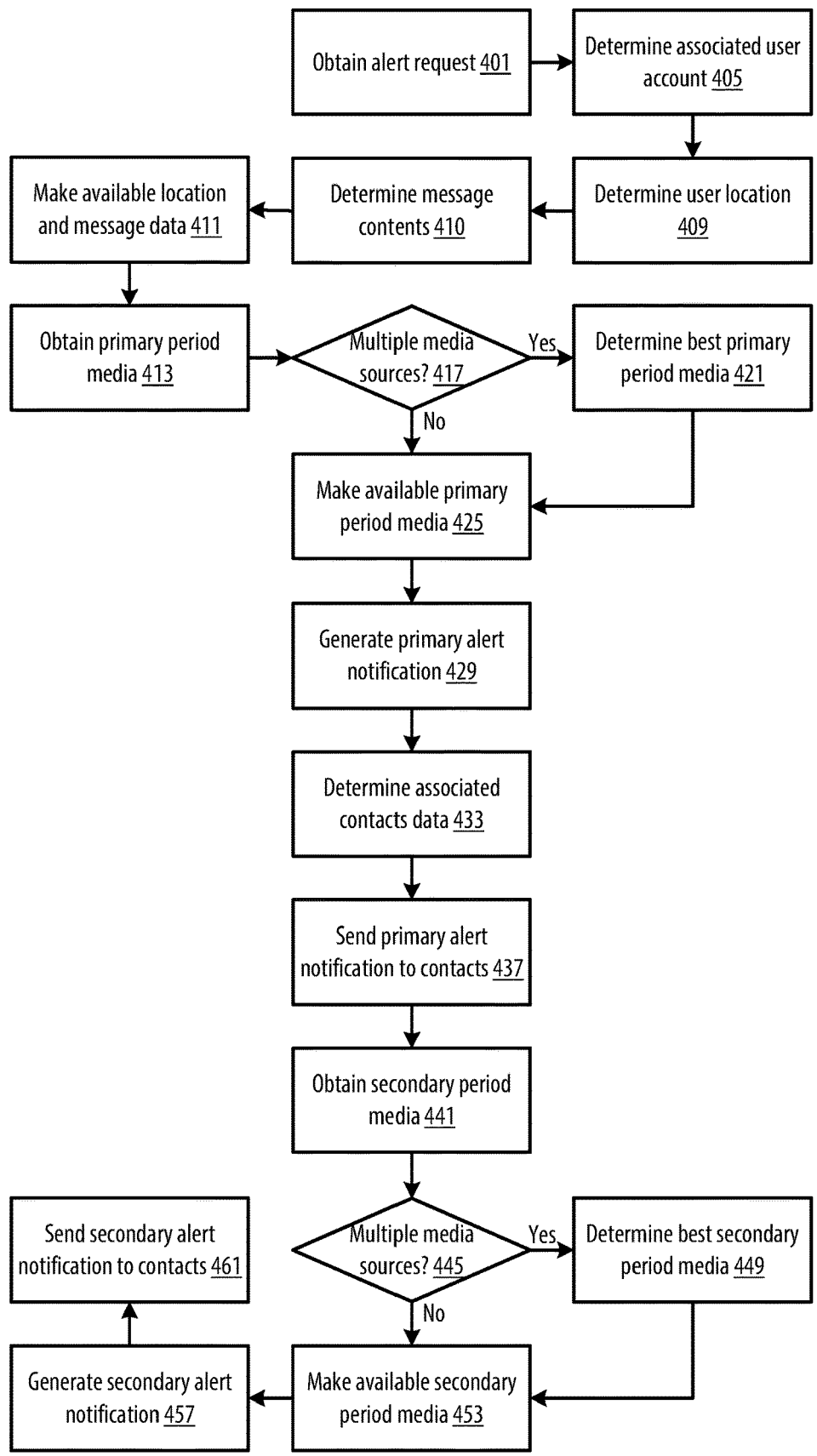

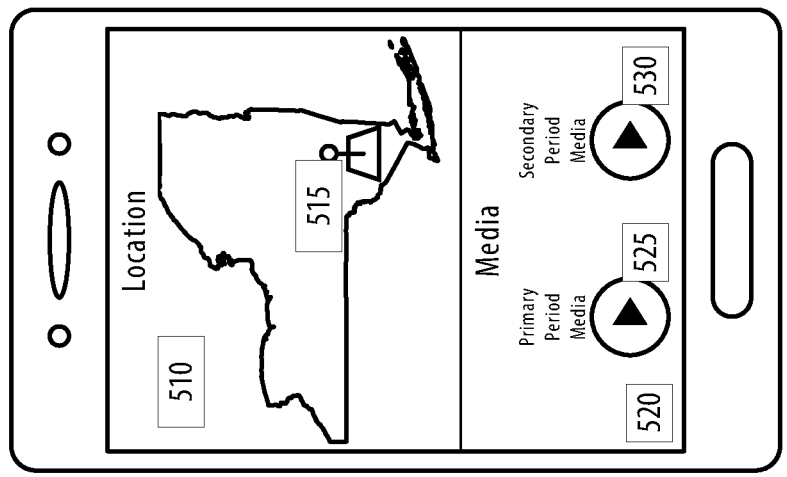
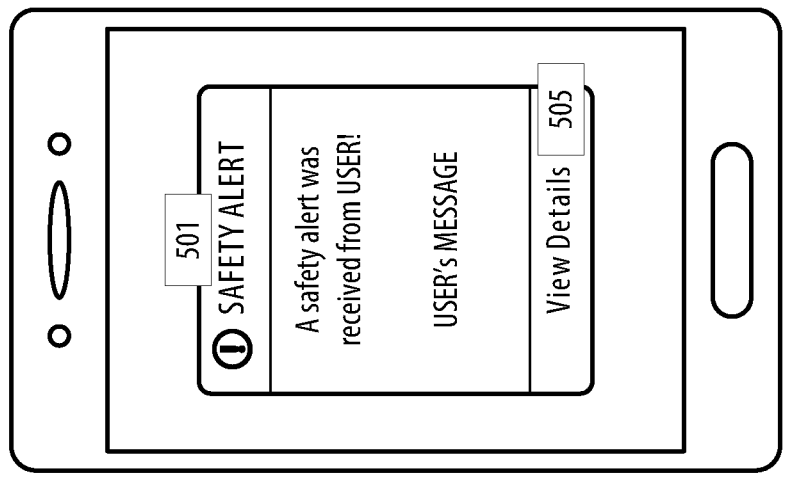
FIGURE 5: SiTa SCREENSHOT

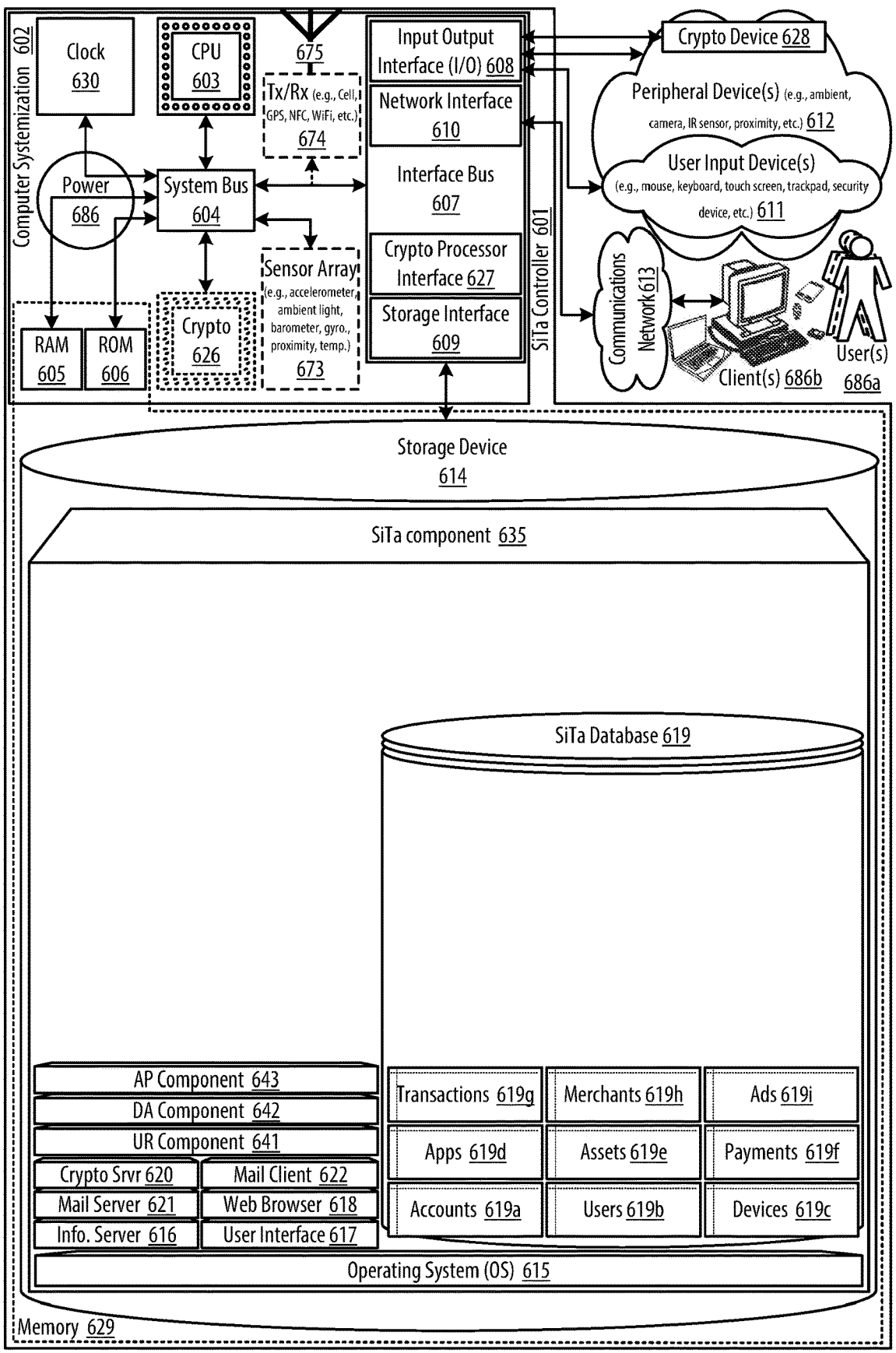
FIGURE 6: SiTa Controller

SITUATION TAG FOR INDIVIDUAL SAFETY APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 62/577,663, filed Oct. 26, 2017, entitled "Situation Tag for Individual Safety Apparatuses, Methods and Systems".

The entire contents of the aforementioned application are herein expressly incorporated by reference.

FIELD

The present innovations generally address personal safety, and more particularly, include Situation Tag for Individual Safety Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Personal alert devices like LifeAlert by Life Alert Emergency Response, Inc. exist and have allowed people in distress to push a button on wearable device to voice their needs to remote phone dispatchers of personal distress, and the dispatchers may, in turn, contact first responders of the incident.

BRIEF DESCRIPTION OF THE DRAWINGS

Appendices and/or drawings illustrating various, non-limiting, example, innovative aspects of the Situation Tag for Individual Safety Apparatuses, Methods and Systems (hereinafter "SiTa") disclosure, include:

FIGS. 1A-B show a datagraph illustrating data flow(s) for the SiTa;

FIG. 2 shows a logic flow illustrating embodiments of a user registration (UR) component for the SiTa;

FIG. 3 shows a logic flow illustrating embodiments of a device activation (DA) component for the SiTa;

FIG. 4 shows a logic flow illustrating embodiments of an alert processing (AP) component for the SiTa;

FIG. 5 shows a screenshot illustrating user interface(s) of the SiTa;

FIG. 6 shows a block diagram illustrating embodiments of a SiTa controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Situation Tag for Individual Safety Apparatuses, Methods and Systems (hereinafter "SiTa") transforms registration request, alert request inputs, via SiTa components (e.g., UR, DA, AP, etc. components), into alert response, alert notification outputs. The SiTa components, in various embodiments, implement advantageous features as set forth below.

INTRODUCTION

The SiTa provides unconventional features (e.g., detection of safety activation events, recording of primary period media and secondary period media via a sensor array, determining relevant contacts based on activation type of a safety activation event, providing primary period alert notifications and secondary period alert notifications to relevant contacts) that were never before available in personal safety.

SiTa incorporates a small discreet design that is "attachable" to clothes and allows usage of the item to lower the probability of hindrance or removal of device by an abuser. In some embodiments, a SiTa device may be utilized with accessories (e.g., pins, buttons, rings, earrings, hair clips, belts, purses, etc.) to hide, conceal, or make wearing the SiTa device more fashionable. In various implementations, the SiTa device may be permanently integrated into an accessory, may be removably affixed to an accessory, may be split into multiple parts (e.g., split into two parts that communicate via Bluetooth LE and integrated into earrings to better conceal the SiTa device), and/or the like. It includes simplicity of use by the user with a One-click aspect to allow the item to be easy to use in an acute situation. In one embodiment, SiTa components utilize cost-effective components to allow easier access of product to victims. SiTa messages to advocates/contacts local to victim allow for intervention in a timelier, more relevant manner SiTa also includes an inability to redact a message to protect victims from "themselves" (e.g., convinced by abuser that situation is OK) or the abuser. In one implementation, SiTa provides a paper trail of incidents that is tamper-proof as record is stored in a 3$^{rd}$ party cloud. A SiTa (e.g., audio, video) recording provides proof of a violent incident to individuals outside of the victim and abuser (e.g., social network, law enforcement, etc.) and as such provides evidence potentially admissible as proof of violence in legal proceedings. Victims, with advocate, can rehear the recording which may provide further proof for the victim to realize an unhealthy situation.

SiTa

FIGS. 1A-B show a datagraph illustrating data flow(s) for the SiTa. In FIGS. 1A-B, dashed lines indicate data flow elements that may be more likely to be optional. In FIGS. 1A-B, a user client 102 (e.g., of a user utilizing a SiTa device 104) may send a registration request 121 to a SiTa server 106 to facilitate configuration of the SiTa device and associated user account. For example, the user client may be a desktop, a laptop, a tablet, a smartphone, a smartwatch, and/or the like that is executing a client application. In one implementation, the registration request may include data such as a request identifier, a user identifier, an account identifier, a user client identifier, a SiTa device identifier, a linked device identifier, default message contents, contacts data and/or the like. In one embodiment, the user client may provide the following example registration request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>SiTa.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
```

```
        <client_product_type>MacPro5,1</client_product_type>
        <client_serial_number>YXXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
      </client_details>
      <registration_request>
        <request_identifier>ID_request_1</request_identifier>
        <account_identifier>ID_account_1</account_identifier>
        <SiTa_device_identifier>ID_SiTa_device_1</SiTa_device_identifier>
        <linked_device_identifier>ID_SiTa_device_1</linked_device_identifier>
        <default_message>"I need help, please respond."</default_message>
        <contacts>
          <contact>
            <Name>Law Enforcement</Name>
            <MessageType>SMS</MessageType>
            <Phone>911</Phone>
            <ActivationType>VOICE_COMMAND:"Police"</ActivationType>
          </contact>
          <contact>
            <Name>Amy</Name>
            <MessageType>SMS</MessageType>
            <Phone>123-456-7890</Phone>
            <MessageType>Email</MessageType>
            <Email>AmyAmy123451234@gmail.com</Email>
            <ActivationType>ACTUATE,
VOICE_COMMAND:"Amy"</ActivationType>
          </contact>
          <contact>
            <Name>Bob</Name>
            <MessageType>Email</MessageType>
            <Email>BobBob123451234@gmail.com</Email>
            <ActivationType>ACTUATE</ActivationType>
          </contact>
          <contact>
            <Name>Cal</Name>
            <MessageType>Facebook</MessageType>
            <FacebookIdentifier>ID_FB_Cal</FacebookIdentifier>
            <ActivationType>ACTUATE, SENSOR:NOISE</ActivationType>
          </contact>
        </contacts>
      </registration_request>
</auth_request>
```

A user registration (UR) component 125 may utilize data provided in the registration request to configure the user's account. See FIG. 2 for additional details regarding the UR component.

The SiTa server may send a registration response 129 to the user client to inform the user that the user's account was configured successfully. In one implementation, the registration response may include data such as a response identifier, a status, and/or the like. In one embodiment, the SiTa server may provide the following example registration response, substantially in the form of a HTTP(S) POST message including XML-formatted data, as provided below:

```
POST/registration_response.php HTTP/1.1
Host: www.server.com
Content-Type: Application/XML
Content-Length: 667
<?XML version="1.0" encoding="UTF-8"?>
<registration_response>
  <response_identifier>ID_response_1</response_identifier>
  <status>OK</status>
</registration_response>
```

A device activation (DA) component 133 may facilitate sending an alert request to the SiTa server when an emergency situation occurs. See FIG. 3 for additional details regarding the DA component.

In some embodiments, the SiTa device may communicate with the SiTa server via the user client. Accordingly, when an alert request should be sent, the SiTa device may send an activation request 137 to the user client to establish communication with the user client. In one implementation, the activation request may be a Bluetooth LE, WiFi, etc. communication request that establishes communication with a SiTa app executing on the user client. In one embodiment, the SiTa device may provide the following example activation request, substantially in the form of a HTTP(S) POST message including XML-formatted data, as provided below:

```
POST/activation_request.php HTTP/1.1
Host: www.server.com
Content-Type: Application/XML
Content-Length: 667
<?XML version="1.0" encoding="UTF-8"?>
<activation_request>
  <request_identifier>ID_request_2</request_identifier>
  <request_type>ACTIVATE</request_type>
  <app_identifier>ID_SiTa_app</app_identifier>
  <SiTa_device_identifier>ID_SiTa_device_1</SiTa_device_identifier>
</activation_request>
```

The user client may send an activation response 141 to the SiTa device to confirm that communication was established successfully. In one embodiment, the user client may provide the following example activation response, substantially in the form of a HTTP(S) POST message including XML-formatted data, as provided below:

POST/activation_response.php HTTP/1.1
Host: www.server.com
Content-Type: Application/XML
Content-Length: 667
<?XML version="1.0" encoding="UTF-8"?>
<activation_response>
   <response_identifier>ID_response_2</response_identifier>
   <status>OK</status>
</activation_response>

The SiTa device may send an alert request 145 to the SiTa server to inform the SiTa server that an emergency situation has occurred. In one embodiment, the alert request may be sent directly to the SiTa server (e.g., via a cellular or WiFi connection of the SiTa device). In another embodiment, the alert request may be sent to the SiTa server via the user client (e.g., the alert request may be sent via Bluetooth LE to the SiTa app, which may forward the alert request to the SiTa server via a cellular or WiFi connection of the user client). In one implementation, the alert request may include data such as a request identifier, a request type, an alert identifier, an account identifier, a SiTa device identifier, an activation type, location data, message data, a timestamp, media contents, and/or the like. In one embodiment, the SiTa device may provide the following example alert request, substantially in the form of a HTTP(S) POST message including XML-formatted data, as provided below:

POST/alert_request.php HTTP/1.1
Host: www.server.com
Content-Type: Application/XML
Content-Length: 667
<?XML version="1.0" encoding="UTF-8"?>
<alert_request>
   <request_identifier>ID_request_3</request_identifier>
   <request_type>ALERT</request_type>
   <alert_identifier>ID_alert_1</alert_identifier>
   <account_identifier>ID_account_1</account_identifier>
   <SiTa_device_identifier>ID_SiTa_device_1</SiTa_device_identifier>
   <ActivationType>ACTUATE</ActivationType>
   <location>GPS coordinates of SiTa device location</location>
   <message>DEFAULT</message>
   <timestamp>"2020-01-01 12:09:05"</timestamp>
   <media>audio recording</media>
</alert_request>

It is to be understood that, in various implementations, multiple alert requests may be sent over time. For example, the first alert request may transmit location, message and timestamp data, the second alert request may submit primary period media and timestamp data (e.g., for the first 30 seconds), and the third alert request may submit secondary period media and timestamp data (e.g., for the last 4 minutes and 30 seconds). In another example, each actuation of the SiTa device during an alert period (e.g., 5 minutes since the last actuation of the SiTa device) may result in transmission of an additional alert request that submits additional primary period media and timestamp data (e.g., for the next 30 seconds), and may reset the timing of the alert request with secondary period media and timestamp data (e.g., for the last 4 minutes and 30 seconds).

In some embodiments, location data provided to the SiTa server via the alert request may take on the form of cell tower information (e.g., an identifier of a cellular tower in communication with the SiTa device and/or the user client). Accordingly, a location request 149 may be sent to a location server 108 to facilitate determining geographic location of the SiTa device and/or the user client from the cell tower information. In one implementation, the location request may include data such as a request identifier, a request type, cell tower info, a device SIM identifier (e.g., of the SiTa device and/or of the user client), and/or the like. In one embodiment, the SiTa server may provide the following example location request, substantially in the form of a HTTP(S) POST message including XML-formatted data, as provided below:

POST/location_request.php HTTP/1.1
Host: www.server.com
Content-Type: Application/XML
Content-Length: 667
<?XML version="1.0" encoding="UTF-8"?>
<location_request>
   <request_identifier>ID_request_4</request_identifier>
   <request_type>CONVERT_TO_GPS</request_type>
   <cell_tower_info>ID_cell_tower_1</cell_tower_info>
   <device_SIM_identifier>ID_SIM_1</device_SIM_identifier>
</location_request>

The location server may send a location response 153 to the SiTa server with the requested location data. In one implementation, the location response may include data such as a response identifier, the requested location data, and/or the like. In one embodiment, the location server may provide the following example location response, substantially in the form of a HTTP(S) POST message including XML-formatted data, as provided below:

POST/location_response.php HTTP/1.1
Host: www.server.com
Content-Type: Application/XML
Content-Length: 667
<?XML version="1.0" encoding="UTF-8"?>
<location_response>
   <response_identifier>ID_response_4</response_identifier>
   <location>converted GPS coordinates</location>
</location_response>

An alert processing (AP) component 157 may facilitate sending alert notifications to the user's contacts when an emergency situation occurs. See FIG. 4 for additional details regarding the AP component.

The SiTa server may send an alert response 161 to the SiTa device to confirm that the alert request was processed successfully. In one embodiment, the alert response may be sent directly to the SiTa device (e.g., via a cellular or WiFi connection of the SiTa device). In another embodiment, the alert response may be sent to the SiTa device via the user client (e.g., the alert response may be sent via a cellular or WiFi connection of the user client to the SiTa app, which may forward the alert response to the SiTa device via Bluetooth LE). In one implementation, the alert response may include data such as a response identifier, a status, and/or the like. In one embodiment, the SiTa server may provide the following example alert response, substantially in the form of a HTTP(S) POST message including XML-formatted data, as provided below:

POST/alert_response.php HTTP/1.1
Host: www.server.com
Content-Type: Application/XML Content-Length: 667
<?XML version="1.0" encoding="UTF-8"?>
<alert_response>
   <response_identifier>ID_response_3</response_identifier>
   <status>OK</status>
</alert_response>

The SiTa server may send an alert notification 165 to a contact client 110 of the user's contact. The alert notification may be used to inform the user's contacts that an emergency situation has occurred and/or to facilitate locating the user and/or accessing media associated with the emergency situation. For example, the alert notification may be displayed using a SiTa website, application (e.g., a mobile app), sent via SMS, sent via email, sent via a Facebook message, sent via a Twitter message, and/or the like. See FIG. 5 for an example of a user interface that may be used to display information provided in the alert notification.

FIG. 2 shows a logic flow illustrating embodiments of a user registration (UR) component for the SiTa. In FIG. 2, a registration request may be obtained from a user at 201. For example, the user registration request may be obtained as a result of a user registering a SiTa device.

An associated user account may be determined at 205. In one embodiment, a new user account may be created for the user. In another embodiment, an existing user account may be updated. In one implementation, the registration request may be parsed (e.g., using PHP commands) to determine an account identifier of the associated user account.

A SiTa device identifier of the SiTa device may be determined at 209. In one embodiment, one SiTa device may be associated with the user account. In another embodiment, multiple SiTa devices may be associated with the user account. For example, each SiTa device may be associated with a different site in the user's home, on the user's body, etc. In one implementation, the registration request may be parsed (e.g., using PHP commands) to determine a SiTa device identifier of the associated SiTa device.

The associated SiTa device may be associated with the user account of the user at 213. For example, the SiTa device may be associated with the user account via a MySQL database command similar to the following:
UPDATE accounts
SET deviceIDs=ID_SiTa_device_1
WHERE accountID=ID_account_1;

A determination may be made at 217 whether to store a default message in the cloud (e.g., on a SiTa server). For example, the default message may be sent to the user's contacts when an emergency situation occurs without the user having to input a message at the time of the emergency situation. In one implementation, this determination may be made based on whether a default message was specified in the registration request.

If a default message should be stored in the cloud, message contents of the default message may be determined at 221. In one implementation, the registration request may be parsed (e.g., using PHP commands) to determine message contents of the default message. The default message may be associated with the user account at 225. For example, the default message may be associated with the user account via a MySQL database command.

Contacts data may be determined at 229. In one embodiment, contacts data may specify information such as contacts who should be contacted when an emergency situation occurs, what kind of message (e.g., SMS, email, Facebook, Twitter) to send to each contact, contact details (e.g., phone number, email address, Facebook identifier, Twitter identifier) for each contact, triggers that determine when each contact should be notified (e.g., when the SiTa device is actuated, when a specified voice command is given, when a sensor detects a specified condition), and/or the like. The contacts data may be associated with the user account at 233. For example, the contacts data may be associated with the user account via a MySQL database command.

A determination may be made at 237 regarding which device should be linked with the user account. In one embodiment, a linked device may send alert requests from the user to the SiTa server. In various implementations, the linked device may be a SiTa device, a user client of the user, or multiple SiTa devices and/or user client devices (e.g., operating collectively to send alert requests based on device priority and/or connection availability). If a SiTa device should be linked, communication info (e.g., SIM card identifier) of the specified SiTa device may be associated with the user account at 241. For example, the communication info of the specified SiTa device may be associated with the user account via a MySQL database command If a user client should be linked, communication info (e.g., SIM card identifier) of the specified user client may be associated with the user account at 245. For example, the communication info of the specified SiTa device may be associated with the user account via a MySQL database command.

FIG. 3 shows a logic flow illustrating embodiments of a device activation (DA) component for the SiTa. In FIG. 3, SiTa device data of a SiTa device may be analyzed at 301 to determine whether an emergency situation has occurred (e.g., whether the SiTa device should be activated). In various embodiments, an emergency situation may be detected based on activation types such as user actuation of the SiTa device (e.g., pressing a button), a voice command from a user, a sensor reading (e.g., an audio sensor registering loud sounds, measuring tonal changes that could signal distress, etc.; a biometric sensor measuring changes in pulse, temperature, moisture (e.g., sweating), etc.; an accelerometer that detects traumatic g-force changes, orthogonally prone situational positioning relative to discerned ambulatory movement positioning, etc.), an activation message from another SiTa device, and/or the like.

A determination may be made at 305 whether an emergency situation has occurred based on user actuation of the SiTa device. In one implementation, this determination may be made based on detecting a button press on the SiTa device. If not, a determination may be made at 309 whether an emergency situation has occurred based on a voice command from the user. In one implementation, this determination may be made by detecting whether a previously specified voice command matching the signature of the user's voice was spoken. If not, a determination may be made at 313 whether an emergency situation has occurred based on a sensor reading. In one implementation, this determination may be made by detecting whether a sensor reading exceeds a specified threshold. If not, the SiTa device may wait for additional activity at 317.

If an emergency situation has been detected (e.g., based on the above determinations or a message from another SiTa device), recording of a primary period media may be initiated at 321. In various embodiments, recorded media may include audio and/or video data (e.g., depending on capabilities of the SiTa device). In various implementations, a primary period may be configured to be a specified length of time (e.g., 10 seconds, 30 seconds).

A determination may be made at 325 whether the SiTa device communicates with a SiTa server directly or via an associated user client. In one implementation, this determination may be made based on a configuration setting of the SiTa device and/or of the user's account. If the SiTa device communicates via a user client, communication with the user client may be established at 329. In one implementation, the SiTa device may send an activation request to the user client to establish communication.

A determination may be made at 333 whether multiple SiTa devices are associated with the user. In one implementation, this determination may be made based on a configuration setting of the SiTa device and/or of the user's account. If so, other SiTa devices (e.g., proximal to the SiTa device) associated with the user may be activated (e.g., if the SiTa device was not activated by another SiTa device) at 337. In one implementation, communication information (e.g., network identifiers) of the other SiTa devices may be retrieved (e.g., from local memory, from a SiTa server) by the SiTa device and/or the user client, and the other SiTa devices may be informed (e.g., via Bluetooth LE, WiFi, etc. communication request) that an emergency situation has been detected.

Location and/or message data may be determined at 341. In various implementations, location data may be GPS data (e.g., determined by the SiTa device and/or by the user client), cell tower information (e.g., an identifier of a cellular tower in communication with the SiTa device and/or the user client), and/or the like. In various implementations, message data may be a default message, a customized default message (e.g., customized to include sensor readings information), a new message specified by the user (e.g., provided via a voice command, typed in via a keyboard), and/or the like.

The determined location and/or message data may be sent to a SiTa server at 345. In one embodiment, the determined location and/or message data may be sent as soon as possible. In one implementation, the determined location and/or message data may be sent via an alert request.

Timestamp data associated with the primary period media may be determined at 349. In one implementation, the date and/or time associated with the primary period media (e.g., when the recording started and/or ended) may be determined. For example, timestamp data may be determined based on an internal clock of the SiTa device and/or of the user client. In another example, timestamp data may be determined based on a network timestamp acquired from a cellular tower, a SiTa server, and/or the like.

The primary period media and/or associated timestamp data may be sent to the SiTa server at 353. In one embodiment, the primary period media may be stored locally (e.g., on the SiTa device and/or the user client) and transmitted to the SiTa server upon completion of the recording. In another embodiment, the primary period media may be live streamed to the SiTa server. In one implementation, the primary period media and/or associated timestamp data may be sent via an alert request.

Recording of a secondary period media may be initiated at 357. In various embodiments, recorded media may include audio and/or video data (e.g., depending on capabilities of the SiTa device). In various implementations, a secondary period may be configured to be a specified length of time (e.g., 4 minutes and 50 seconds, 4 minutes and 30 seconds, 10 minutes).

The secondary period media and/or associated timestamp data may be sent to the SiTa server at 361. In one embodiment, the secondary period media may be stored locally (e.g., on the SiTa device and/or the user client) and transmitted to the SiTa server upon completion of the recording. In another embodiment, the secondary period media may be live streamed to the SiTa server. In one implementation, the secondary period media and/or associated timestamp data may be sent via an alert request.

A determination may be made at 365 whether data was sent to the SiTa server successfully. In one implementation, this determination may be made based on whether an alert response was received from the SiTa server. Data that was not sent successfully may be stored locally at 369, and may be retransmitted to the SiTa server (e.g., when a network connection with the SiTa server is reestablished) at 373. If data was sent successfully, the SiTa device may be deactivated at 377.

FIG. 4 shows a logic flow illustrating embodiments of an alert processing (AP) component for the SiTa. In FIG. 4, an alert request from a user may be obtained by a SiTa server at 401. For example, the alert request may be obtained as a result of the user actuating a SiTa device to indicate that an emergency situation has occurred.

User account associated with the alert request may be determined at 405. In one implementation, the alert request may be parsed (e.g., using PHP commands) to determine an account identifier of the associated user account. In another implementation, the alert request may be parsed (e.g., using PHP commands) to determine a SiTa device identifier, and the account identifier of the associated user account may be determined via a MySQL database command similar to the following:

SELECT accountID
FROM devices
WHERE deviceID=ID_SiTa_device_1;

The user's location may be determined at 409. In one implementation, the alert request may be parsed (e.g., using PHP commands) to determine geographic coordinates (e.g., GPS) of the user's location. In another implementation, the alert request may be parsed (e.g., using PHP commands) to determine cell tower information (e.g., an identifier of a cellular tower in communication with the SiTa device and/or the user client), and a location server may be queried (e.g., via a location request) to determine geographic coordinates of the user's location.

Message contents may be determined at 410. In one implementation, the alert request may be parsed (e.g., using PHP commands) to determine message contents (e.g., based on an indication that the default message should be used, based on a custom message provided in the alert request).

Location and/or message data may be made available at 411. In one implementation, location and/or message data may be made accessible via a link to a SiTa website, application (e.g., a mobile app), and/or the like where location and/or message data may be viewed.

Primary period media may be obtained at 413. In one implementation, primary period media may be obtained via an alert request (e.g., from one or more SiTa devices associated with the user account). A determination may be made at 417 whether multiple primary period media sources are available (e.g., whether multiple SiTa devices sent primary period media). If so, the best primary period media may be determined at 421. In one implementation, the best primary period media may be determined based on media quality (e.g., the primary period media with the best audio and/or video quality). In another implementation, the best primary period media may be determined as a compilation of media portions from multiple sources that provides the best media quality.

The primary period media may be made available at 425. In one implementation, the primary period media may be made accessible via a link to a SiTa website, application (e.g., a mobile app), and/or the like where the primary period media may be viewed.

A primary alert notification may be generated at 429. In various embodiments, the primary alert notification may be a web site notification, app notification, SMS, email, Facebook message, Twitter message, and/or the like that includes primary alert notification data such as location data, message data, the primary period media, and/or the like. In one implementation, primary alert notification data may be embedded directly in the alert notification. In another implementation, primary alert notification data may be accessible via a link in the alert notification.

Associated contacts data may be determined at 433. In one implementation, contacts associated with the user account that should receive the primary alert notification (e.g., based on the activation type associated with the SiTa device) may be determined and such contacts' contact details (e.g., phone number, email address, Facebook identifier, Twitter identifier) may be retrieved (e.g., via a MySQL database command)

The primary alert notification may be sent to the determined contacts at 437. The primary alert notification may be used to inform the user's contacts that an emergency situation has occurred and/or to facilitate locating the user and/or accessing media (e.g., primary period media) associated with the emergency situation.

Secondary period media may be obtained at 441. In one implementation, secondary period media may be obtained via an alert request (e.g., from one or more SiTa devices associated with the user account). A determination may be made at 445 whether multiple secondary period media sources are available (e.g., whether multiple SiTa devices sent secondary period media). If so, the best secondary period media may be determined at 449. In one implementation, the best secondary period media may be determined based on media quality (e.g., the secondary period media with the best audio and/or video quality). In another implementation, the best secondary period media may be determined as a compilation of media portions from multiple sources that provides the best media quality.

The secondary period media may be made available at 453. In one implementation, the secondary period media may be made accessible via a link to a SiTa website, application (e.g., a mobile app), and/or the like where the secondary period media may be viewed.

A secondary alert notification may be generated at 457. In various embodiments, the secondary alert notification may be a website notification, app notification, SMS, email, Facebook message, Twitter message, and/or the like that includes secondary alert notification data such as the secondary period media, additional message data (e.g., provided by the user shortly after an emergency situation has occurred), and/or the like. In one implementation, secondary alert notification data may be embedded directly in the alert notification. In another implementation, secondary alert notification data may be accessible via a link in the alert notification.

The secondary alert notification may be sent to the determined contacts at 461. The secondary alert notification may be used to provide additional information to the user's contacts and/or to facilitate accessing media (e.g., secondary period media) associated with the emergency situation.

FIG. 5 shows a screenshot illustrating user interface(s) of the SiTa. In FIG. 5, an exemplary user interface (e.g., for a mobile device) for providing an alert notification to a user's contact is illustrated. An alert notification 501 shows that the contact may be informed that a safety alert was received from the user and that a message from the user may be shown to the contact. The contact may actuate (e.g., click on) view details widget 505 to obtain additional information (e.g., location information and media).

A location section 510 may show the user's logged location. For example, a tag widget 515 may indicate the user's location on a map. A media section 520 may facilitate playback of media associated with the alert notification. For example, the user may actuate (e.g., click on) play primary period media widget 525 to begin playback of primary period media. In another example, the user may actuate (e.g., click on) play secondary period media widget 530 to begin playback of secondary period media.

Additional Alternative Embodiment Examples

The following alternative example embodiments provide a number of variations of some of the core principles already discussed for expanded color on the abilities of the SiTa.

Alternative Embodiment 1

Hardware Features

The device has a cellular modem, button, microphone, processor, and nonvolatile memory. The device runs on a battery which is rechargeable through a USB connection. When the button is pressed the device is activated. Upon activation the following happens.

The modem connects to a cellular provider

Messages may be sent to the cloud and text messages may be sent to one or more phones Store 5 minutes of audio in non-volatile memory, which is also transmitted. Audio may be retrieved through a USB connector to a PC or phone.

The device records high quality audio even when the audio has to pass through clothing to the device The USB port may be used for charging the battery and downloading of stored audio.

Web Site Features

A web site accessible by the user of the device may do the following.

Register the device by entering an identifying number, such as a serial number printed on the device, and the name of the user.

Enter phone numbers of people to be contacted when the device is activated, the "contact list".

Enter a written message to be sent when the device is activated.

Firmware Features

The device keeps track of time-of-day, correcting the clock during cellular communications or when being set up.

When activated by pushing the button the device does the following.

Start recording audio with a time stamp indicating the start time

At 30 seconds the following may be sent to the cloud:
The first 30 seconds of audio as a file
The serial number of the device
The time and date
The cell tower identification At 5 minutes, the following may be done:
The audio ceases to record
Store the entire 5-minute audio into non-volatile memory on the device
Transmit the remaining 4.5-minute audio file along with the device serial number to the cloud In some implementations, in order to keep the device small and low cost, communications with the device may happen over the data channel—the device may not have a normal voice, SMS (text messaging) or MMS capability. Data only may be used. The device may not be able to start a call or send or receive text messages.

When a USB cable is attached, the stored 5 minutes of audio can be retrieved through a USB connector to a PC or phone.

Cloud Software Features

The data is received in the cloud within a few seconds of being sent.

- Receive an alert message from a device when it is activated
- Store the 30 second audio along with the user's name, the device, and the device serial number
- Send a text message to the pre-programmed phone numbers with a link to the audio clip. The audio may be played by clicking on the link
- Accept the cell tower information and process it to determine approximate location using a third-party service
- Accept the last 4.5 minutes of audio from the device and store it
- Provide a way to view the location of the device on a map
- Provide a way to listen to the 30 second and 4.5-minute audio files stored in the cloud and to view the user name, device identifying number, and text message.

Alternative Embodiment 2

Hardware Features

The device may have Bluetooth or Bluetooth LE, processor, button, annunciator, and nonvolatile memory. The device may run on a battery which is rechargeable through a microUSB connection or have a non-rechargeable battery usable for a fixed duration (e.g., no shorter than 10 total recording hours). When the button is pressed the device may be activated. Upon activation the following happens.

- The device connects to a smartphone via Bluetooth or Bluetooth LE.
- Audio and text can be transmitted to the phone via Bluetooth or Bluetooth LE.
- Store up to 10 minutes of audio in non-volatile memory.
- The device records high quality audio even when the audio has to pass through clothing to the device A microUSB port may be used for charging the battery, if the battery is rechargeable.

The device may be tamper resistant to meet a legal challenge.

The device may have size and weight of a quarter, though a smooth exterior may allow it to be twice as large without becoming uncomfortable or obviously visible.

Firmware Features

The device may keep track of time-of-day, correcting the clock during communication with the phone.

When activated by pushing the button the device may do the following.

- Start recording audio with a timestamp indicating the start time.
- Send an alert message to the phone immediately with the device serial number.
- At 10 seconds the following is sent to the phone
  - The first 10 seconds of audio as a file
  - The serial number of the device
  - The time and date
- Continue recording audio.
- If the button is pushed again within 5 minutes since the last time it was pushed, transmit to the phone the newly stored audio with time, date, and serial number.
- Continue to repeat the above, if the button is pushed within 5 minutes of the last time it was pushed.
- After 5 minutes with no button pressed, the following is done.
- The audio ceases to record
  - Transmit to the phone the newly stored audio with time, date, and serial number.
- If there is no phone access up to 10 minutes of audio is stored with the start time.
- When phone access is available, the audio may be transmitted with the device serial number and the time and date.

The device may be tamper resistant to meet a legal challenge.

Phone App Features

A phone app may be utilized in Android, iOS, etc.

The phone app may be installed so it is always running.

The app may configure the device as follows. The setup information may be sent to the cloud.

- Register the device by entering an identifying number during initial Bluetooth pairing, such as a serial number printed on the device, and the name of the user. The serial number could be stored and sent automatically, reducing user error.
- Enter phone numbers of people to be contacted when the device is activated, the "contact list".
- Enter a written message to be sent when the device is activated.
- Allow user access to previously stored audio recordings.
- When the firmware sends audio, text, etc. messages to the phone, the app sends them to the cloud.
- When a message is sent to the cloud the phone may also send its location to the cloud. The location may use GPS, cell tower information, etc.
- If the phone has no access to the cloud the data is stored and transmitted when access is available.

Cloud Software Features

- Receive the audio and text as described in Firmware Features and store it.
- Send a text message to the pre-programmed phone numbers with a link to the audio clips. The audio may be played by clicking on the link.
- Receive the cell tower location information. Use a service to convert this to the cell phone location.
- Provide a way to view the location of the device on a map.
- Provide a way to listen to the full audio files stored in the cloud and to view the user name, device serial number, and text message.
- The cloud may be configured to display the latest audio and messages.

Alternative Embodiment 3

Devices

Ability to integrate multiple devices onto a single account—optimize for sound/clarity/location/power to provide best recording and transmission of accurate information Device may be constructed in a way to be "hidden" in multiple formats.

- Attachment mechanism that is ideal for concealed points under clothing (e.g., bra, belt buckle (i.e. paper clip with teeth))
- Concealment with accessories—rings, watches, necklaces, cufflinks Concealment points in active/need specific clothing (e.g., jogging clothes, sneakers, shoes)
May use flexible material construction
Device may be thin (e.g., no more than 3 mm in thickness)
Accuracy and reliability for safety and health use cases
Non-tamperability of data
Notification of alert
Device may emit a beep when on and stop with a following beep
Sends GPS location at activation to contacts
Records 10 seconds and sends to contacts (no additional press needed)
Ability to record continuously for 5 minutes and store recording to cloud
Rechargeable batteries (e.g., solar, charging station, charging pad), low battery usage, activated
Device may connect via Bluetooth or WiFi (e.g., setup via app)
Hardware notification if location does not permit/restricts use under state laws through location services (cell, modem)
User Application Interface
Ability to associate hardware device(s) with an account
Have secure storage of audio recordings (non-tamperable)
Ability to share copies of the audio recordings with others but does not allow any editing of file
One-time pin for audio link download
Confirmation of chain of custody (device ID #, time, location)
Temporary audio storage
Transmittal and compression of data
Battery life of Mic may be shown in app
Name of app and item may be obscure/stealth in appearance (e.g., if Bluetooth is on, will not show up as something easily recognizable to people other than the user)
Device may not transmit to other devices
Access phone contacts and sync with phone
Choose number of contacts to send message/GPS location to Adjust outgoing message upon activation
Status of user
Via app clarify if everything is "okay" after activation of device and message sent out to contacts
Data Integrity
Data is validated and time/location stamped at collection on device.
Data may be assigned a descriptor with location of device (e.g., lower body/shoes/near neck, etc.) with high degree of accuracy for evidentiary purposes
If device is out of power, data may be stored locally until device is recharged and then transmitted per protocol
Other data the device may collect includes registering loud sounds, measuring tonal changes that could signal distress, biometrics including pulse, temperature, moisture.
Once transmission occurs, data may be stored permanently and tagged with relevant information including time/date/location/device.
Data can be retrieved by user or by court order. However, data is not destroyed in order to protect from future abuse.
Data Collection
Data may be collected by a single or multiple devices assigned to an individual. Once one device is activated, all the devices may activate, record and transmit information to the server.
Optimization of Data: Data is processed to isolate distress signal. Data could be delivered from a single source or a compilation of multiple sources that provide the clearest sound quality.
Data, both original and aggregated, may be stored permanently.
Once optimal "alert" has been isolated, data may then be transmitted to individuals assigned in the application interface.
If data is collected in a state where there are dual-consent laws, device may "speak" to notify that there is a recording
Activation
Activation may be via a button compression
Activation via sensors—through utilization of biometric data and correlation of information collected through uses of the device, predictive alerts may be established (e.g., loud noise, rising body temperature, sweating, physical pressure, etc. could start recordings)
Activation via verbal commands—ability to start recordings, assign a key word (may not be the same for everyone, different words may direct message to specific individuals or law enforcement)
Automatic activation option across all devices
Data Protocol
End to end encryption, privacy
Ability to store forever/for long periods in a secured, retrievable format
Data Transmission
Data is collected through activation of the device
If device is functional, data is transmitted to be processed
Data may be collected from multiple sources, encrypted and time stamped so data can be aggregated to optimize sound quality and have multiple validation of location and time
If data cannot be transmitted (e.g., out of battery power, destruction of device), data may remain locally stored until retrieved SiTa Controller FIG. 6 shows a block diagram illustrating embodiments of a SiTa controller. In this embodiment, the SiTa controller 601 may serve to aggregate, process, store, search, serve, identify, instruct, generate, match, and/or facilitate interactions with a computer through personal safety technologies, and/or other related data.

Users, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SiTa controller 601 may be connected to and/or communicate with entities such as, but not limited to: one or more users from peripheral devices 612 (e.g., user input devices 611); an optional cryptographic processor device 628; and/or a communications network 613.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The SiTa controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 may be connected to the system bus. In another embodiment, the cryptographic processor, transceivers (e.g., ICs) 674, and/or sensor array (e.g., accelerometer, altimeter, ambient light, barometer, global positioning system (GPS) (thereby allowing SiTa controller to determine its location), gyroscope, magnetometer, pedometer, proximity, ultra-violet sensor, etc.) 673 may be connected as either internal and/or external peripheral devices 612 via the interface bus I/O 608 (not pictured) and/or directly via the interface bus 607. In turn, the transceivers may be connected to antenna(s) 675, thereby effectuating wireless transmission and reception of various communication and/or sensor protocols; for example the antenna(s) may connect to various transceiver chip sets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's Dragon-Ball® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the SiTa controller and beyond through various interfaces. Should processing requirements dictate a greater amount speed and/or capacity, distributed processors (e.g., see Distributed SiTa below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SiTa may be achieved by implementing a microcontroller such as CAST's® R8051XC2 microcontroller; Intel's® MCS 51 (i.e., 8051 microcontroller); and/or the like. Also, to implement certain features of the SiTa, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SiTa component collection (distributed or otherwise) and/or features may be implemented via the microprocessor and/or via embedded components; e.g., via ASIC, coprocessor, DSP, FPGA, and/or the like. Alternately, some implementations of the SiTa may be implemented with embedded components that are configured and used to achieve a variety of features or signal processing.

Depending on the particular implementation, the embedded components may include software solutions, hardware solutions, and/or some combination of both hardware/software solutions. For example, SiTa features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the SiTa features. A hierarchy of programmable interconnects allow logic blocks to be interconnected as needed by the SiTa system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SiTa may be developed on FPGAs and then migrated into a fixed version that more resembles ASIC implementations. Alternate or coordinating implementations may migrate SiTa controller features to a final ASIC instead of or in addition to FPGAs. Depending on the implementation all of the aforementioned embedded components and microprocessors may be considered the "CPU" and/or "processor" for the SiTa.

Power Source

The power source 686 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the SiTa thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, variously although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the SiTa controller is accessible through remote clients 633*b* (e.g., computers with web browsers) by users 633*a*. Network interfaces may employ connection protocols such as, but not limited to: direct connect, Ethernet (thick, thin, twisted pair 10/100/1000/

10000 Base T, and/or the like), Token Ring, wireless connection such as IEEE 802.11a-x, and/or the like. Should processing requirements dictate a greater amount speed and/or capacity, distributed network controllers (e.g., see Distributed SiTa below), architectures may similarly be employed to pool, load balance, and/or otherwise decrease/increase the communicative bandwidth required by the SiTa controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user, peripheral devices 612 (e.g., input devices 611), cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 612 may be connected and/or communicate to I/O and/or other facilities of the like such as network interfaces, storage interfaces, directly to the interface bus, system bus, the CPU, and/or the like. Peripheral devices may be external, internal and/or part of the SiTa controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SiTa controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the SiTa controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the SiTa controller and/or a computer systemization may employ various forms of memory 629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 629 will include ROM 606, RAM 605, and a storage device 614. A storage device 614 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the SiTa component(s) 635; and/or the like (i.e., collectively a component collection). These components may be stored and accessed from the storage devices and/or from storage devices accessible through an interface bus. Although unconventional program components such as those in the component collection may be stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the SiTa controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SiTa controller to communicate with other entities through a communications network 613. Various communication protocols may be used by the SiTa controller as a subcarrier transport mechanism for interaction, such as, but not limited to: multicast, TCP/IP, UDP, unicast, and/or the like.

Information Server

An information server component 616 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SiTa controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SiTa database 619, operating systems, other program components, user interfaces, Web browsers, and/or the like.

Access to the SiTa database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SiTa. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the SiTa as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 617 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SiTa enabled nodes. The combined application may be nugatory on systems employing Web browsers.

Mail Server

A mail server component 621 is a stored program component that is executed by a CPU 603. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SiTa. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the SiTa mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SiTa may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the SiTa component to engage in secure transactions if so desired. The cryptographic component facilitates the secure accessing of resources on the SiTa and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SiTa Database

The SiTa database component 619 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SiTa database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SiTa database is implemented as a data-structure, the use of the SiTa database 619 may be integrated into another component such as the SiTa component 635. Also, the database may be implemented as a mix of data structures, objects, and relational structures. Databases may be consolidated and/or distributed in countless variations (e.g., see Distributed SiTa below). Portions of databases, e.g., tables, may be exported and/or imported and thus decentralized and/or integrated.

In one embodiment, the database component 619 includes several tables 619a-i:

An accounts table 619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 619*b* includes fields such as, but not limited to: a userID, userSSN, taxID, userContactID, accountID, as setIDs, deviceID s, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SiTa);

An devices table 619*c* includes fields such as, but not limited to: deviceID, sensorIDs, accountID, as setIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_ associated_tool, sensor_dimensions, device_dimensions, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 619*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, app Restrictions, portNum, access_API_call, linked_wallets_list, and/or the like;

An assets table 619*e* includes fields such as, but not limited to: assetID, accountID, userID, distributorAccountID, distributorPaymentID, distributorOnwerID, assetOwnerID, as setType, as setSourceDeviceID, as setSourceDeviceType, as setSourceDeviceName, as setSourceDistributionChannelID, assetSourceDistributionChannelType, as setSourceDistributionChannelName, as setTargetChannelID, assetTargetChannelType, as setTargetChannelName, as setName, assetSeriesName, assetSeriesSeason, as setSeriesEpisode, assetCode, assetQuantity, assetCost, as setPrice, assetValue, as setManufactuer, as setModelNo, as setSerialNo, assetLocation, assetAddress, assetState, assetZIPcode, assetState, assetCountry, assetEmail, assetIPaddress, assetURLaccessCode, as setOwnerAccountID, sub scriptionIDs, as setAuthroizationCode, assetAccessPrivileges, as setPreferences, as setRestrictions, assetAPI, assetAPIconnectionAddress, and/or the like;

A payments table 619*f* includes fields such as, but not limited to: paymentID, accountID, userID, couponID, couponValue, couponConditions, couponExpiration, paymentType, paymentAccountNo, paymentAccountName, p aymen tAcc oun tAuthorizationCodes, paymentExpirationDate, paymentCCV, paymentRoutingNo, paymen tRoutingType, paymentAddress, paymentState, p aymentZIPcode, paymentCountry, paymentEmail, paymen tAuthKey, paymentIPaddress, paymentURLaccessCode, paymentPortNo, paymentAccessPrivileges, paymentPreferences, payementRestrictions, and/or the like;

An transactions table 619*g* includes fields such as, but not limited to: transactionID, accountID, as setIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 619*h* includes fields such as, but not limited to: merchantID, merchantTaxID, merchanteName, merchantContactUserID, accountID, is suerID, acquirerID, merchantEmail, merchantAddress, merchantState, merchantZIPcode, merchantCountry, merchantAuthKey, merchantIPaddres s, p ortNum, merchantURLaccessCode, merchantPortNo, merchantAcces sPrivileges, merchantPreferences, merchantRestrictions, and/or the like;

An ads table 619*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNe tworkXchangeName, adNe tworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, siteP- age, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like.

In one embodiment, the SiTa database may interact with other database systems. For example, employing a distributed database system, queries and data access by search SiTa component may treat the combination of the SiTa database, an integrated data security layer database as a single database entity (e.g., see Distributed SiTa below).

In one embodiment, user programs may contain various user interface primitives, which may serve to update the SiTa. Also, various accounts may require custom database tables depending upon the environments and the types of clients the SiTa may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 619a-i. The SiTa may be configured to keep track of various settings, inputs, and parameters via database controllers.

The SiTa database may communicate to and/or with other components in a component collection, including itself, and/or facilities of the like. Most frequently, the SiTa database communicates with the SiTa component, other program components, and/or the like. The database may contain, retain, and provide information regarding other nodes and data.

The SiTas

The SiTa component 635 is a stored program component that is executed by a CPU. In one embodiment, the SiTa component incorporates any and/or all combinations of the aspects of the SiTa that was discussed in the previous figures. As such, the SiTa affects accessing, obtaining and the provision of information, services, transactions, and/or the like across various communications networks. The features and embodiments of the SiTa discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SiTa's features and facilities, and in many cases reduce the costs, energy consumption/requirements, and extend the life of SiTa's underlying infrastructure; this has the added benefit of making the SiTa more reliable. Similarly, many of the features and mechanisms are designed to be easier for users to use and access, thereby broadening the audience that may enjoy/employ and exploit the feature sets of the SiTa; such ease of use also helps to increase the reliability of the SiTa. In addition, the feature sets include heightened security as noted via the Cryptographic components 620, 626, 628 and throughout, making access to the features and data more reliable and secure The SiTa transforms registration request, alert request inputs, via SiTa components (e.g., UR, DA, AP), into alert response, alert notification outputs.

The SiTa component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the SiTa server employs a cryptographic server to encrypt and decrypt communications. The SiTa component may communicate to and/or with other components in a component collection, including itself, and/or facilities of the like. Most frequently, the SiTa component communicates with the SiTa database, operating systems, other program components, and/or the like. The SiTa may contain, communicate, generate, obtain, and/or provide program component, system, user, and/or data communications, requests, and/or responses.

Distributed SiTas

The structure and/or operation of any of the SiTa node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the SiTa controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for SiTa controller and/or SiTa component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SiTa controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
$input=" ";
$input=socket_read($client, 1024);
$data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.
IBMDI.doc/referenceguide295.htm and other parser implementations:

http://publib.boulder.ibm.com/infocenter/tivihelp/v2r1/index.jsp?topic=/com.ibm.
IBMDI.doc/referenceguide259.htm all of which are hereby expressly incorporated by reference.

Additional embodiments may include:

1. A situational safety monitoring apparatus, comprising:
a memory;
a component collection in the memory, including:
a device activation component;
a processor disposed in communication with the memory, and configured to issue a plurality of processing instructions from the component collection stored in the memory,
wherein the processor issues instructions from the device activation component, stored in the memory, to:
detect, via a situational safety device of a user, a safety activation event;
record, via at least one processor, primary period media via a sensor array, wherein the sensor array includes any of: a microphone, a camera;
establish, via at least one processor, network communication with an app instantiated on a paired mobile device of the user, wherein the paired mobile device is any of: a smartphone, a smartwatch;
determine, via at least one processor, location data associated with the situational safety device;
provide, via at least one processor, the location data to the paired mobile device for transfer to a remote situational safety server;
determine, via at least one processor, a timestamp for the primary period media;
provide, via at least one processor, the primary period media and the timestamp to the paired mobile device for transfer to the remote situational safety server;
record, via at least one processor, secondary period media via the sensor array; and
provide, via at least one processor, the secondary period media to the paired mobile device for transfer to the remote situational safety server.

2. The apparatus of embodiment 1, wherein the safety activation event is any of: user actuation of a button of the situational safety device, a voice command from the user, a sensor reading.

3. The apparatus of embodiment 1, wherein activation type of the safety activation event determines a set of contacts associated with the user to be notified by the remote situational safety server.

4. The apparatus of embodiment 1, wherein the safety activation event is an activation message from another linked situational safety device of the user.

5. The apparatus of embodiment 1, wherein length of the primary period media is between 10 seconds and 30 seconds.

6. The apparatus of embodiment 1, wherein the sensor array further includes any of: (a) a biometric sensor measuring changes in pulse, temperature, or moisture, (b) an accelerometer that detects traumatic g-force changes, or orthogonally prone situational positioning relative to discerned ambulatory movement positioning.

7. The apparatus of embodiment 1, wherein the location data includes any of: GPS coordinates of the situational safety device, identifier of a cellular tower in communication with the situational safety device.

8. The apparatus of embodiment 1, wherein the timestamp is determined based on a network timestamp acquired from any of: a cellular tower in communication with the situational safety device, the remote situational safety server.

9. The apparatus of embodiment 1, wherein the primary period media is stored in local storage of the situational safety device prior to being provided for transfer to the remote situational safety server.

10. The apparatus of embodiment 1, wherein the primary period media is live streamed to the remote situational safety server.

11. The apparatus of embodiment 1, wherein length of the secondary period media is between 4 minutes 30 seconds and 10 minutes.

12. The apparatus of embodiment 1, further, comprising:
the processor issues instructions from the device activation component, stored in the memory, to:
obtain, via at least one processor, message data from the user; and
provide, via at least one processor, the message data to the paired mobile device for transfer to the remote situational safety server.

13. The apparatus of embodiment 12, wherein the message data includes sensor readings information from the sensor array.

14. The apparatus of embodiment 1, wherein the remote situational safety server is configured to send out a primary alert notification to a set of contacts associated with the user, wherein the primary alert notification facilitates displaying the user's location based on the location data and facilitates accessing the primary period media.

15. The apparatus of embodiment 14, wherein the remote situational safety server is configured to send out a secondary alert notification to the set of contacts associated with the user, wherein the secondary alert notification facilitates accessing the secondary period media.

16. A processor-readable situational safety monitoring non-transient physical medium storing processor-executable components, the components, comprising:
a component collection stored in the medium, including:
a device activation component;
wherein the device activation component, stored in the medium, includes processor-issuable instructions to:
detect, via a situational safety device of a user, a safety activation event; record, via at least one processor, primary period media via a sensor array, wherein the sensor array includes any of: a microphone, a camera;
establish, via at least one processor, network communication with an app instantiated on a paired mobile device of the user, wherein the paired mobile device is any of: a smartphone, a smartwatch;
determine, via at least one processor, location data associated with the situational safety device;
provide, via at least one processor, the location data to the paired mobile device for transfer to a remote situational safety server;
determine, via at least one processor, a timestamp for the primary period media;
provide, via at least one processor, the primary period media and the timestamp to the paired mobile device for transfer to the remote situational safety server;
record, via at least one processor, secondary period media via the sensor array; and
provide, via at least one processor, the secondary period media to the paired mobile device for transfer to the remote situational safety server.

17. The medium of embodiment 16, wherein the safety activation event is any of: user actuation of a button of the situational safety device, a voice command from the user, a sensor reading.

18. The medium of embodiment 16, wherein activation type of the safety activation event determines a set of contacts associated with the user to be notified by the remote situational safety server.

19. The medium of embodiment 16, wherein the safety activation event is an activation message from another linked situational safety device of the user.

20. The medium of embodiment 16, wherein length of the primary period media is between 10 seconds and 30 seconds.

21. The medium of embodiment 16, wherein the sensor array further includes any of: (a) a biometric sensor measuring changes in pulse, temperature, or moisture, (b) an accelerometer that detects traumatic g-force changes, or orthogonally prone situational positioning relative to discerned ambulatory movement positioning.

22. The medium of embodiment 16, wherein the location data includes any of: GPS coordinates of the situational safety device, identifier of a cellular tower in communication with the situational safety device.

23. The medium of embodiment 16, wherein the timestamp is determined based on a network timestamp acquired from any of: a cellular tower in communication with the situational safety device, the remote situational safety server.

24. The medium of embodiment 16, wherein the primary period media is stored in local storage of the situational safety device prior to being provided for transfer to the remote situational safety server.

25. The medium of embodiment 16, wherein the primary period media is live streamed to the remote situational safety server.

26. The medium of embodiment 16, wherein length of the secondary period media is between 4 minutes 30 seconds and 10 minutes.

27. The medium of embodiment 16, further, comprising:
the device activation component, stored in the medium, includes processor-issuable instructions to:
obtain, via at least one processor, message data from the user; and provide, via at least one processor, the message data to the paired mobile device for transfer to the remote situational safety server.

28. The medium of embodiment 27, wherein the message data includes sensor readings information from the sensor array.

29. The medium of embodiment 16, wherein the remote situational safety server is configured to send out a primary alert notification to a set of contacts associated with the user, wherein the primary alert notification facilitates displaying the user's location based on the location data and facilitates accessing the primary period media.

30. The medium of embodiment 29, wherein the remote situational safety server is configured to send out a secondary alert notification to the set of contacts associated with the user, wherein the secondary alert notification facilitates accessing the secondary period media.

31. A processor-implemented situational safety monitoring system, comprising:
 a device activation component means, to:
  detect, via a situational safety device of a user, a safety activation event;
  record, via at least one processor, primary period media via a sensor array, wherein the sensor array includes any of: a microphone, a camera;
  establish, via at least one processor, network communication with an app instantiated on a paired mobile device of the user, wherein the paired mobile device is any of: a smartphone, a smartwatch;
  determine, via at least one processor, location data associated with the situational safety device;
  provide, via at least one processor, the location data to the paired mobile device for transfer to a remote situational safety server;
  determine, via at least one processor, a timestamp for the primary period media;
  provide, via at least one processor, the primary period media and the timestamp to the paired mobile device for transfer to the remote situational safety server;
  record, via at least one processor, secondary period media via the sensor array; and
  provide, via at least one processor, the secondary period media to the paired mobile device for transfer to the remote situational safety server.

32. The system of embodiment 31, wherein the safety activation event is any of: user actuation of a button of the situational safety device, a voice command from the user, a sensor reading.

33. The system of embodiment 31, wherein activation type of the safety activation event determines a set of contacts associated with the user to be notified by the remote situational safety server.

34. The system of embodiment 31, wherein the safety activation event is an activation message from another linked situational safety device of the user.

35. The system of embodiment 31, wherein length of the primary period media is between 10 seconds and 30 seconds.

36. The system of embodiment 31, wherein the sensor array further includes any of: (a) a biometric sensor measuring changes in pulse, temperature, or moisture, (b) an accelerometer that detects traumatic g-force changes, or orthogonally prone situational positioning relative to discerned ambulatory movement positioning.

37. The system of embodiment 31, wherein the location data includes any of: GPS coordinates of the situational safety device, identifier of a cellular tower in communication with the situational safety device.

38. The system of embodiment 31, wherein the timestamp is determined based on a network timestamp acquired from any of: a cellular tower in communication with the situational safety device, the remote situational safety server.

39. The system of embodiment 31, wherein the primary period media is stored in local storage of the situational safety device prior to being provided for transfer to the remote situational safety server.

40. The system of embodiment 31, wherein the primary period media is live streamed to the remote situational safety server.

41. The system of embodiment 31, wherein length of the secondary period media is between 4 minutes 30 seconds and 10 minutes.

42. The system of embodiment 31, further, comprising:
 the device activation component means, to:
  obtain, via at least one processor, message data from the user; and
  provide, via at least one processor, the message data to the paired mobile device for transfer to the remote situational safety server.

43. The system of embodiment 42, wherein the message data includes sensor readings information from the sensor array.

44. The system of embodiment 31, wherein the remote situational safety server is configured to send out a primary alert notification to a set of contacts associated with the user, wherein the primary alert notification facilitates displaying the user's location based on the location data and facilitates accessing the primary period media.

45. The system of embodiment 44, wherein the remote situational safety server is configured to send out a secondary alert notification to the set of contacts associated with the user, wherein the secondary alert notification facilitates accessing the secondary period media.

46. A processor-implemented situational safety monitoring method, comprising:
 executing processor-implemented device activation component instructions to:
  detect, via a situational safety device of a user, a safety activation event;
  record, via at least one processor, primary period media via a sensor array, wherein the sensor array includes any of: a microphone, a camera;
  establish, via at least one processor, network communication with an app instantiated on a paired mobile device of the user, wherein the paired mobile device is any of: a smartphone, a smartwatch;
  determine, via at least one processor, location data associated with the situational safety device;
  provide, via at least one processor, the location data to the paired mobile device for transfer to a remote situational safety server;
  determine, via at least one processor, a timestamp for the primary period media;
  provide, via at least one processor, the primary period media and the timestamp to the paired mobile device for transfer to the remote situational safety server;
  record, via at least one processor, secondary period media via the sensor array; and
  provide, via at least one processor, the secondary period media to the paired mobile device for transfer to the remote situational safety server.

47. The method of embodiment 46, wherein the safety activation event is any of: user actuation of a button of the situational safety device, a voice command from the user, a sensor reading.

48. The method of embodiment 46, wherein activation type of the safety activation event determines a set of contacts associated with the user to be notified by the remote situational safety server.

49. The method of embodiment 46, wherein the safety activation event is an activation message from another linked situational safety device of the user.

50. The method of embodiment 46, wherein length of the primary period media is between 10 seconds and 30 seconds.

51. The method of embodiment 46, wherein the sensor array further includes any of: (a) a biometric sensor measuring changes in pulse, temperature, or moisture, (b) an accelerometer that detects traumatic g-force changes, or orthogonally prone situational positioning relative to discerned ambulatory movement positioning.

52. The method of embodiment 46, wherein the location data includes any of: GPS coordinates of the situational safety device, identifier of a cellular tower in communication with the situational safety device.

53. The method of embodiment 46, wherein the timestamp is determined based on a network timestamp acquired from any of: a cellular tower in communication with the situational safety device, the remote situational safety server.

54. The method of embodiment 46, wherein the primary period media is stored in local storage of the situational safety device prior to being provided for transfer to the remote situational safety server.

55. The method of embodiment 46, wherein the primary period media is live streamed to the remote situational safety server.

56. The method of embodiment 46, wherein length of the secondary period media is between 4 minutes 30 seconds and 10 minutes.

57. The method of embodiment 46, further, comprising:
   executing processor-implemented device activation component instructions to:
      obtain, via at least one processor, message data from the user; and
      provide, via at least one processor, the message data to the paired mobile device for transfer to the remote situational safety server.

58. The method of embodiment 57, wherein the message data includes sensor readings information from the sensor array.

59. The method of embodiment 46, wherein the remote situational safety server is configured to send out a primary alert notification to a set of contacts associated with the user, wherein the primary alert notification facilitates displaying the user's location based on the location data and facilitates accessing the primary period media.

60. The method of embodiment 59, wherein the remote situational safety server is configured to send out a secondary alert notification to the set of contacts associated with the user, wherein the secondary alert notification facilitates accessing the secondary period media.

101. A situational safety apparatus, comprising:
a memory;
a component collection in the memory;
a processor disposed in communication with the memory, and configured to issue a plurality of processing instructions from the component collection stored in the memory, to:
   detect a safety actuation event from an instantiated actuation component, wherein an actuation event includes any of: actuation of a button, monitoring for an audible safety phrase, monitoring accelerometers for traumatic g-force changes, monitoring accelerometers for orthogonally prone situational positioning relative to discerned ambulatory movement positioning;
   record safety sensor information from a sensor array upon detecting the safety actuation event, wherein the sensor array includes any of: microphone, camera, accelerometer, ambient light, temperature, proximity;
   determine target recipients from stored preferences, wherein the target recipients include any of: cloud storage servers, streaming servers, local memory storage, local network storage, social network accounts, email addresses, instant message contacts, telephony;
   retrieve required credentials for determined target recipients, wherein credentials include any of: target protocols, target credentials, target address;
   connect to the determined target recipients with the retrieved required credentials;
   transfer recordings of safety sensor information via the connection to the determined target recipients.

102. The apparatus of embodiment 101, further, comprising:
   confirming transfer of recordings of safety sensor information to users, wherein the users include any of: the wearer of a situational safety apparatus, target recipients, first responders, authorities.

103. The apparatus of embodiment 101,
   wherein target credentials include any of: username, password, digital certificates;
   wherein target protocols include any of: FTP, SMB, WebDAV, HTTP, social network media posting; and
   wherein target address includes any of: URL, streaming IP address, telephone phone number.

In order to address various issues and advance the art, the entirety of this application for Situation Tag for Individual Safety Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SiTa individual and/or enterprise user, database configuration and/or relational model, data type, data transmission and/or network framework, syntax structure, and/or the like, various embodiments of the SiTa, may be implemented that allow a great deal of flexibility and customization. For example, aspects of the SiTa may be adapted for ordering services/goods, contacting friends/relatives, message services, etc. While various embodiments and discussions of the SiTa have included personal safety, however, it is to be understood that the embodiments described herein may be readily configured and/or customized for a wide variety of other applications and/or implementations. In one implementation, the SiTa may be utilized for elder care. For example, a SiTa device may be utilized to detect falls, medical conditions (e.g., high blood pressure), and/or the like. In another implementation, the SiTa may be utilized for child monitoring. For example, a SiTa device may be utilized to detect crying, abnormal vital signs (e.g., slow heart rate), and/or the like. In another implementation, the SiTa may be utilized for extreme sport safety. For example, a SiTa device may be utilized to detect high impact falls, whiplash, and/or the like.

What is claimed is:

1. A situational safety monitoring apparatus, comprising:
a memory;
a component collection in the memory, including:
a device activation component;
a processor disposed in communication with the memory, and configured to issue a plurality of processing instructions from the component collection stored in the memory,
wherein the processor issues instructions from the device activation component, stored in the memory, to:
detect, via a situational safety device of a user, a safety activation event;
record, via at least one processor, primary period media via a sensor array, wherein the sensor array includes any of: a microphone, a camera;
establish, via at least one processor, network communication with an app instantiated on a paired mobile device of the user, wherein the paired mobile device is any of: a smartphone, a smartwatch;
determine, via at least one processor, location data associated with the situational safety device;
provide, via at least one processor, the location data to the paired mobile device for transfer to a remote situational safety server;
determine, via at least one processor, a timestamp for the primary period media;
provide, via at least one processor, the primary period media and the timestamp to the paired mobile device for transfer to the remote situational safety server;
record, via at least one processor, secondary period media via a sensor array,
wherein the secondary period media is recorded at a time subsequent to the primary period media,
wherein recording for the secondary period media includes actuation of at least one other subsequent recording device disposed in communication with any of the instantiated app, the mobile device, and the remote situational safety server,
wherein the at least one other subsequent recording device is recording at least at a time subsequent to the primary period media recording and
provide, via at least one processor, the secondary period media to the paired mobile device for transfer to the remote situational safety server, wherein a best recording among all subsequent time recordings is provided.

2. The apparatus of claim 1, wherein the safety activation event is any of: user actuation of a button of the situational safety device, a voice command from the user, a sensor reading.

3. The apparatus of claim 1, wherein activation type of the safety activation event determines a set of contacts associated with the user to be notified by the remote situational safety server.

4. The apparatus of claim 1, wherein the safety activation event is an activation message from another linked situational safety device of the user.

5. The apparatus of claim 1, wherein length of the primary period media is between 10 seconds and 30 seconds.

6. The apparatus of claim 1, wherein the sensor array further includes any of: (a) a biometric sensor measuring changes in pulse, temperature, or moisture, (b) an accelerometer that detects traumatic g-force changes, or orthogonally prone situational positioning relative to discerned ambulatory movement positioning.

7. The apparatus of claim 1, wherein the location data includes any of: GPS coordinates of the situational safety device, identifier of a cellular tower in communication with the situational safety device.

8. The apparatus of claim 1, wherein the timestamp is determined based on a network timestamp acquired from any of: a cellular tower in communication with the situational safety device, the remote situational safety server.

9. The apparatus of claim 1, wherein the primary period media is stored in local storage of the situational safety device prior to being provided for transfer to the remote situational safety server.

10. The apparatus of claim 1, wherein the primary period media is live streamed to the remote situational safety server.

11. The apparatus of claim 1, wherein length of the secondary period media is between 4 minutes 30 seconds and 10 minutes.

12. The apparatus of claim 1, further, comprising:
the processor issues instructions from the device activation component, stored in the memory, to:
obtain, via at least one processor, message data from the user; and
provide, via at least one processor, the message data to the paired mobile device for transfer to the remote situational safety server.

13. The apparatus of claim 12, wherein the message data includes sensor readings information from the sensor array.

14. The apparatus of claim 1, wherein the remote situational safety server is configured to send out a primary alert notification to a set of contacts associated with the user, wherein the primary alert notification facilitates displaying the user's location based on the location data and facilitates accessing the primary period media.

15. The apparatus of claim 14, wherein the remote situational safety server is configured to send out a secondary alert notification to the set of contacts associated with the user, wherein the secondary alert notification facilitates accessing the secondary period media.

16. A processor-readable situational safety monitoring non-transient physical medium storing processor-executable components, the components, comprising:
a component collection stored in the medium, including:
a device activation component;
wherein the device activation component, stored in the medium, includes processor-issuable instructions to:
detect, via a situational safety device of a user, a safety activation event;
record, via at least one processor, primary period media via a sensor array, wherein the sensor array includes any of: a microphone, a camera;
establish, via at least one processor, network communication with an app instantiated on a paired mobile device of the user, wherein the paired mobile device is any of: a smartphone, a smartwatch;
determine, via at least one processor, location data associated with the situational safety device;
provide, via at least one processor, the location data to the paired mobile device for transfer to a remote situational safety server;
determine, via at least one processor, a timestamp for the primary period media;
provide, via at least one processor, the primary period media and the timestamp to the paired mobile device for transfer to the remote situational safety server;
record, via at least one processor, secondary period media via a sensor array,
wherein the secondary period media is recorded at a time subsequent to the primary period media;
wherein recording for the secondary period media includes actuation of at least one other subsequent recording device disposed in communication with any of the instantiated app, the mobile device, and the remote situational safety server,
wherein the at least one other subsequent recording device is recording at least at a time subsequent to the primary period media recording; and
provide, via at least one processor, the secondary period media to the paired mobile device for transfer to the remote situational safety server, wherein a best recording among all subsequent time recordings is provided.

17. A processor-implemented situational safety monitoring system, comprising:
a memory means for storing data;
a device activation component means disposed in communication with the memory means, to:
detect, via a situational safety device of a user, a safety activation event;
record, via at least one processor, primary period media via a sensor array, wherein the sensor array includes any of: a microphone, a camera;
establish, via at least one processor, network communication with an app instantiated on a paired mobile device of the user, wherein the paired mobile device is any of: a smartphone, a smartwatch;
determine, via at least one processor, location data associated with the situational safety device;
provide, via at least one processor, the location data to the paired mobile device for transfer to a remote situational safety server;
determine, via at least one processor, a timestamp for the primary period media;
provide, via at least one processor, the primary period media and the timestamp to the paired mobile device for transfer to the remote situational safety server;
record, via at least one processor, secondary period media via a sensor array,
wherein the secondary period media is recorded at a time subsequent to the primary period media;
wherein recording for the secondary period media includes actuation of at least one other subsequent recording device disposed in communication with any of the instantiated app, the mobile device, and the remote situational safety server,
wherein the at least one other subsequent recording device is recording at least at a time subsequent to the primary period media recording; and
provide, via at least one processor, the secondary period media to the paired mobile device for transfer to the remote situational safety server, wherein a best recording among all subsequent time recordings is provided.

18. A processor-implemented situational safety monitoring method, comprising:

executing processor-implemented device activation component instructions to:
- detect, via a situational safety device of a user, a safety activation event;
- record, via at least one processor, primary period media via a sensor array, wherein the sensor array includes any of: a microphone, a camera;
- establish, via at least one processor, network communication with an app instantiated on a paired mobile device of the user, wherein the paired mobile device is any of: a smartphone, a smartwatch;
- determine, via at least one processor, location data associated with the situational safety device;
- provide, via at least one processor, the location data to the paired mobile device for transfer to a remote situational safety server;
- determine, via at least one processor, a timestamp for the primary period media;
- provide, via at least one processor, the primary period media and the timestamp to the paired mobile device for transfer to the remote situational safety server;
- record, via at least one processor, secondary period media via a sensor array,
  - wherein the secondary period media is recorded at a time subsequent to the primary period media;
  - wherein recording for the secondary period media includes actuation of at least one other subsequent recording device disposed in communication with any of the instantiated app, the mobile device, and the remote situational safety server, and
- provide, via at least one processor, the secondary period media to the paired mobile device for transfer to the remote situational safety server, wherein a best recording among all subsequent time recordings is provided.

* * * * *